United States Patent
Eggeling et al.

(10) Patent No.: US 8,766,563 B2
(45) Date of Patent: Jul. 1, 2014

(54) DRIVE ARRANGEMENT FOR THE MOTOR-DRIVEN ADJUSTMENT OF AN ADJUSTABLE ELEMENT IN A MOTOR VEHICLE

(75) Inventors: Jürgen Eggeling, Mulheim an der Ruhr (DE); Klaus Dünne, Ratingen (DE); Dirk Hellmich, Duisburg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 266 days.

(21) Appl. No.: 13/125,693

(22) PCT Filed: Sep. 21, 2009

(86) PCT No.: PCT/EP2009/006789
§ 371 (c)(1),
(2), (4) Date: Jun. 28, 2011

(87) PCT Pub. No.: WO2010/046008
PCT Pub. Date: Apr. 29, 2010

(65) Prior Publication Data
US 2012/0146556 A1 Jun. 14, 2012

(30) Foreign Application Priority Data
Oct. 25, 2008 (DE) .......................... 10 2008 053 113

(51) Int. Cl.
*H02P 5/00* (2006.01)
*H02P 5/68* (2006.01)
(52) U.S. Cl.
CPC ........................................ *H02P 5/68* (2013.01)
USPC ............... 318/99; 318/71; 318/432; 318/434; 318/799; 318/801; 318/802

(58) Field of Classification Search
CPC ........................................................ H02P 5/68
USPC ................... 318/99, 432, 434, 799, 801, 802
See application file for complete search history.

(56) References Cited

U.S. PATENT DOCUMENTS

| 3,845,366 A | | 10/1974 | Metzler et al. | |
|---|---|---|---|---|
| 5,473,958 A | * | 12/1995 | Jeck et al. | .................... 74/89.36 |
| 5,625,262 A | * | 4/1997 | Lapota | ............................ 318/71 |

(Continued)

FOREIGN PATENT DOCUMENTS

| DE | 4041087 | 7/1990 |
|---|---|---|
| DE | 19523241 | 1/1997 |
| DE | 202007005749 | 12/2007 |
| EP | 0994560 | 4/2000 |

(Continued)

OTHER PUBLICATIONS

Michael Lindeburg, Engineer-In-Training Reference Manual, 8$^{th}$ edition, p. 50-2, Professional Publications Inc, 1995.*

*Primary Examiner* — David Luo
(74) *Attorney, Agent, or Firm* — Pauly, Devries, Smith & Deffner, LLC

(57) ABSTRACT

Described herein is a drive arrangement for the motor-driven adjustment of an adjustable element in a motor vehicle, the drive arrangement having two electrical drives and a control device, the drives, in the fitted state, acting in the same way on the adjustable element and having a substantially identical configuration, apart from tolerance-related discrepancies. The control device has a power controller which, in the fitted state, during the motor-driven adjustment of the adjustable element, subjects the electrical power that is output respectively to the two drives to closed-loop control, for the purpose of compensating for the tolerance-related discrepancies, in such a way that an identical electrical power consumption is established for both drives.

22 Claims, 4 Drawing Sheets

(56) References Cited

U.S. PATENT DOCUMENTS

| | | | | |
|---|---|---|---|---|
| 5,874,815 | A * | 2/1999 | Griessbach | 318/283 |
| 7,070,226 | B2 * | 7/2006 | Cleland et al. | 296/146.8 |
| 7,170,262 | B2 * | 1/2007 | Pettigrew | 322/32 |
| 2005/0168010 | A1 | 8/2005 | Cleland et al. | |

FOREIGN PATENT DOCUMENTS

| | | |
|---|---|---|
| EP | 1746715 | 1/2007 |
| EP | 1862628 | 12/2007 |
| JP | 2008084492 | 4/2008 |
| WO | 98/37297 | 8/1998 |

* cited by examiner

DRIVE ARRANGEMENT FOR THE MOTOR-DRIVEN ADJUSTMENT OF AN ADJUSTABLE ELEMENT IN A MOTOR VEHICLE

CROSS-REFERENCE TO RELATED APPLICATIONS

This application is a national stage application under 35 U.S.C. 371 of International Patent Application Serial No. PCT/EP2009/006789, entitled "MOTOR VEHICLE LOCK," filed Sep. 21, 2009, which claims priority from German Patent Application No. 10 2008 053 113.8, filed Oct. 25, 2008, the disclosures of which are incorporated herein by reference.

FIELD OF THE INVENTION

The present invention relates to a drive arrangement for the motor-driven adjustment of an adjustable element in a motor vehicle, an adjustable element arrangement in a motor vehicle and a method for driving such a drive arrangement.

BACKGROUND

The term "adjustable element" should in this case be understood in the all-encompassing sense. Correspondingly, this term includes any adjustable elements in a motor vehicle, such as a tailgate, a deck lid, an engine bay cover, a cargo compartment cover, a side door—including a sliding door—, a cargo floor and a sunroof of a motor vehicle. In addition, these include, for example, motor-adjustable window panes, mirrors or vehicle seats.

With the aim of increasing comfort in modern motor vehicles, the motor-driven adjustment of the abovementioned adjustable elements, for example the tailgate, of a motor vehicle is gaining increasing importance. For this purpose, a drive arrangement is provided which is coupled to the respective adjustable element via a drive train.

The known drive arrangement (EP 1 862 628 A1), on which the present invention is based, is equipped with two electrical drives. The two drives are configured in the form of spindle drives and each have an electrical drive motor with a spindle/spindle nut transmission connected downstream thereof. The two spindle drives are arranged on the two peripheral sides of a tailgate and each act independently, but in the same way, on the tailgate. The two spindle drives are arranged correspondingly such that, given the same drive forces, they introduce the same drive torques on both peripheral sides into the tailgate.

For the motor-driven adjustment of the tailgate, generally the same drive voltage is applied to the two spindle drives. In this case, it is assumed that the motor characteristics of the two drive motors are identical.

However, it has been shown in trials that the motor characteristics of the drive motors in question are subject to tolerance-related differences. This results, inter alia, in different drive currents and correspondingly different drive forces or torques being established for identical drive speed and identical drive voltage. That is to say that one drive will always consume more electrical power and output correspondingly more mechanical power than the other drive. This generally results in the drive which is always subject to a greater load having a reduced life.

Various control engineering approaches for driving the drive arrangement in question have been disclosed, for example a control device in which specifically determined open-loop and/or closed-loop control concepts are used for each adjustment phase of the adjustable element (EP 1 860 265 A2). However, the aspect of non-uniform wear on the two drives is not addressed in this document either.

SUMMARY OF THE INVENTION

The invention is based on the problem of configuring and developing the known drive arrangement such that the life to be expected for the two drives is the same as far as possible despite tolerance-related differences between the drives.

The above problem is solved in a drive arrangement for the motor-driven adjustment of an adjustable element in a motor vehicle, the drive arrangement having two electrical drives and a control device, the drives, in the fitted state, acting in the same way on the adjustable element and having a substantially identical configuration, apart from tolerance-related discrepancies characterized in that the control device has a power controller which, in the fitted state, in particular during the motor-driven adjustment of the adjustable element, subjects the electrical power that is output respectively to the two drives to closed-loop control, for the purpose of compensating for the tolerance-related discrepancies, in such a way that an identical electrical power consumption is established for both drives.

In order to avoid non-uniform wear on the two drives, the invention proposes that the control device be equipped with a power controller, which ensures that identical electrical power consumption is always established for both drives.

In this case, the power controller is intended to be designed in such a way that it compensates for the slight, tolerance-related discrepancies between the two drives. This can therefore be referred to as precision control.

Where the text which follows mentions an electrical power, an electrical current or an electrical voltage, this is always intended to mean the mean power, the mean current or the mean voltage. This is worth mentioning because the two drives are advantageously operated with pulse-width-modulated (PWM) drive voltages, with the result that correspondingly pulsed electrical power and current values are produced.

In one configuration, the power controller generates a respective manipulated variable for the drive voltages of the two drives such that an identical electrical power consumption is established for both drives in the above manner. Thus, the drive voltages of the two drives are different, depending on tolerance-related discrepancy.

In another configuration, it is the case that the power controller generates the manipulated variables for the two drive voltages on the basis of the present drive currents and the present drive voltages of the two drives, to be precise in such a way that the electrical powers consumed by the two drives approximate to one another in the above sense.

In another configuration, the power controller in accordance with the proposal is connected downstream of a movement controller for the closed-loop control of in particular the adjustment speed of the adjustable element. In this case, the power controller converts the manipulated variable generated by the movement controller into two separate manipulated variables associated with the two drives in such a way that both closed-loop movement control and closed-loop power control are ensured in the above sense.

Using the above power controller it is possible in a simple manner to compensate for the tolerance-related discrepancies between the drives, insofar as differences in the motor characteristics are concerned.

In accordance with a further teaching which has its own significance, the above problem is solved in the case of an adjustable element arrangement in a motor vehicle with an adjustable element and a drive arrangement for the motor-driven adjustment of the adjustable element, the drive arrangement having two electrical drives and a control device, the drives acting in the same way on the adjustable element and having a substantially identical configuration, apart from tolerance-related discrepancies, characterized in that the control device has a power controller which, in particular during the motor-driven adjustment of the adjustable element subjects the electrical power that is output respectively to the two drives to closed-loop control, for the purpose of compensating for the tolerance-related discrepancies, in such a way that an identical electrical power consumption is established for both drives.

The adjustable element arrangement is equipped with an abovementioned drive arrangement in accordance with the proposal. Reference can be made to the statements with regard to the drive arrangement in accordance with the proposal.

In accordance with a further teaching with its own significance, the above problem is solved in a method for driving a drive arrangement which is used for the motor-driven adjustment of an adjustable element in a motor vehicle, the drive arrangement having two electrical drives and a control device, the drives, in the fitted state, acting in the same way on the adjustable element and having a substantially identical configuration, apart from tolerance-related discrepancies, characterized in that, in particular during the motor-driven adjustment of the adjustable element, the electrical power that is output respectively to the two drives is subjected to closed-loop control, for the purpose of compensating for the tolerance-related discrepancies, in such a way that an identical electrical power consumption is established for both drives, wherein the drive arrangement is in particular an above-mentioned drive arrangement in accordance with the proposal.

In particular during the motor-driven adjustment of the adjustable element, the electrical power that is output respectively to the two drives is subjected to closed-loop control, for the purpose of compensating for the tolerance-related discrepancies, in such a way that an identical electrical power consumption is established for both drives. In this context too, reference can be made to the statements regarding the drive arrangement in accordance with the proposal insofar as these statements are suitable for explaining the method in accordance with the proposal.

BRIEF DESCRIPTION OF THE DRAWINGS

The invention will be explained in more detail below with reference to an exemplary embodiment. In the drawing.

DETAILED DESCRIPTION

Figure 1:
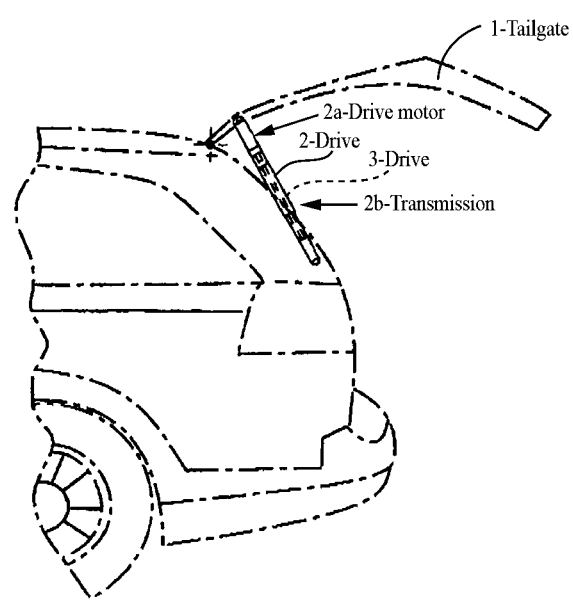
FIG. 1 shows a schematic illustration of a side view of the tail end of a motor vehicle with the tailgate open with a drive arrangement in accordance with the proposal.

The drive arrangement according to the proposal is used for the motor-driven adjustment of an adjustable element 1 in a motor vehicle. The drawing relates to the application of the drive arrangement for an adjustable element 1 in the form of a tailgate. Although this is advantageous, it should not be considered to be restrictive. The statements below therefore almost without exception relate to an adjustable element 1 in the form of a tailgate. These statements fully also apply to other types of adjustable elements 1.

The drive arrangement is equipped with two electrical drives 2, 3, of which only the front drive 2 can be seen in FIG. 1. Regarding the drives 2, 3, reference can be made to the German utility model DE 20 2007 005 749 U1, which can be attributed to the applicant and which to this extent is made the subject matter of the present application.

Figure 2:
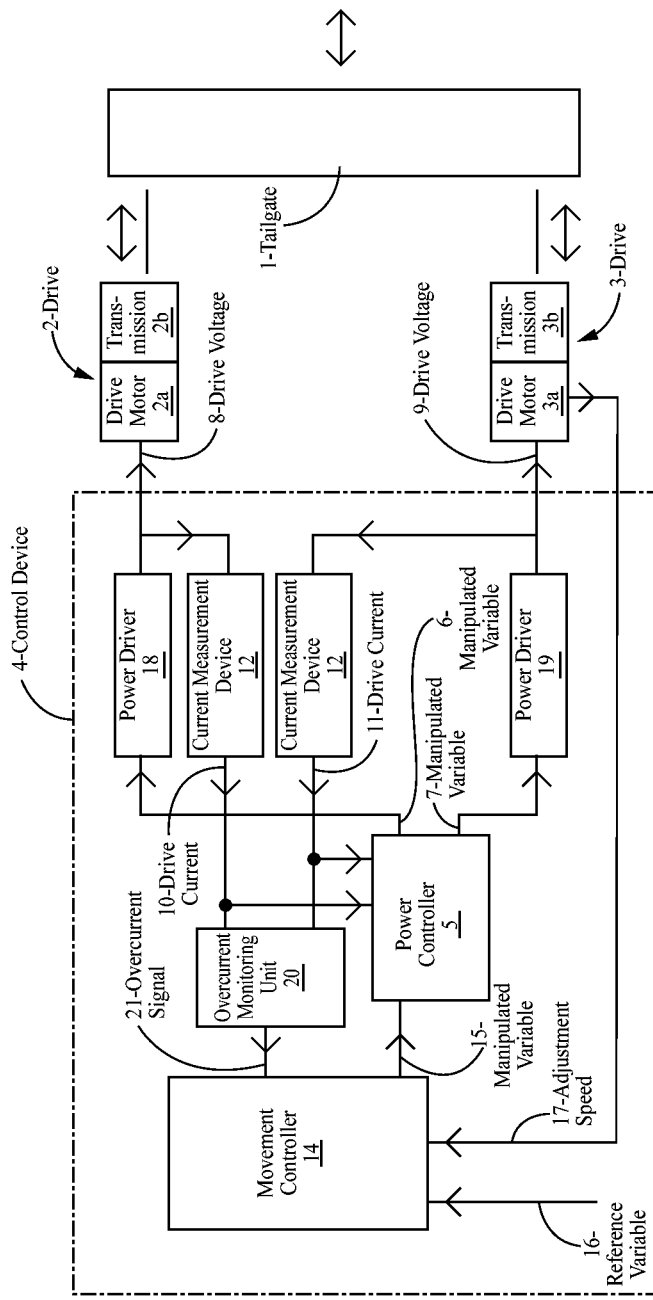
FIG. 2 shows a block diagram of the drive arrangement shown in FIG. 1.

In addition, the drive arrangement is equipped with a control device 4, which serves the purpose of driving the two drives 2, 3. The control device 4 is illustrated in FIG. 2. It can be implemented as a separate unit or as part of a central motor vehicle electronic system. It is also conceivable for there to be a decentralized configuration with a plurality of control modules arranged distributed in the drives 2, 3, for example.

In the fitted state, the drives 2, 3 act in the same way on the tailgate 1. The two drives 2, 3 are arranged correspondingly in such a way that they introduce the same drive torques into the tailgate on both peripheral sides given the same drive forces. In addition, the drives 2, 3 have a substantially identical configuration, apart from tolerance-related discrepancies. The two last-mentioned aspects have the effect that one and the same drive voltage can be applied to the two drives 2, 3 without any disadvantages, assuming that the abovementioned tolerance-related discrepancies are absent.

However, it is assumed here that there are tolerance-related discrepancies between the drives 2, 3 which lead to the non-uniform wear on the drives 2, 3 explained further above. For this reason, the control device 4 is equipped with a power controller 5 which, in the fitted state, subjects the electrical power that is output respectively to the two drives 2, 3 to closed-loop control for the purpose of compensating for the tolerance-related discrepancies, to be precise in such a way that an identical electrical power consumption is established for both drives 2, 3. The closed-loop control in accordance with the proposal is provided in particular during the motor-driven adjustment of the tailgate 1. However, it is also conceivable for the closed-loop control according to the proposal to be provided during holding mode, in which the tailgate 1 is held in a certain position by correspondingly energizing and counter-energizing the drives 2, 3. The way in which the closed-loop control according to the proposal can take place in detail will be explained further below.

The term "power controller" should be understood functionally here. It is therefore not important whether the power controller 5 is implemented as a separate unit or as a separate module electronically or by means of software; it is merely essential that the operation of the power controller 5 is ensured.

The drives 2, 3 are each equipped with an electrical drive motor 2a, 3a and with a transmission 2b, 3b connected downstream, which is yet to be explained. The drive motors 2a, 3a are in this case and preferably DC motors.

The drive motors 2a, 3a are driven in a particularly preferred configuration using a pulse-width-modulated (PWM) drive voltage. Low-loss closed-loop control of an adjustment operation can thus be realized in a particularly simple manner.

It has already been explained further above that tolerance-related discrepancies occur in electrical drive motors 2a, 3a, with these discrepancies being attributed in particular to tolerance-related differences in the motor characteristics of the drive motors 2a, 3a. This results in the nonuniform wear mentioned above.

The nonuniform wear is particularly noticeable when the drives 2, 3, in the fitted state, are coupled to the adjustable element 1 in such a way that the drive speeds of the two drives 2, 3 are always identical to one another during a motor-driven adjustment. This is in particular the case when the adjustable element 1, in this case the tailgate 1, has a rigid design and the drives 2, 3 are coupled in terms of movement to the adjustable element 1, in this case to the tailgate 1.

In the event that the two drives 2, 3 are driven by an identical drive voltage, the above coupling of the drives 2, 3 to the tailgate 1 means that the two drives 2, 3 act with different drive torques or forces on the tailgate 1, which is exactly what results in the above-mentioned nonuniform wear.

Correspondingly, it is in this case and preferably true that the power controller 5 generates a respective manipulated variable 6, 7 for the drive voltages 8, 9 of the two drives 2, 3 in such a way that an identical electrical power consumption is established for both drives 2, 3. By virtue of the drive voltages 8, 9 being set, the power controller 5 influences the electrical powers consumed by the two drives 2, 3 in such a way that the above identical power consumption is established.

As will be explained further below, the manipulated variables 6, 7 are preferably identical to the drive voltages 8, 9, apart from a proportionality factor which may be provided.

The feedback required for the above closed-loop power control is preferably achieved by determination of the drive currents consumed by the two drives 2, 3. For this purpose, appropriate current measurement devices 12, 13 are associated with the power controller 5. The drive currents are illustrated in FIG. 2 on the output side of the measurement devices 12, 13 by the reference symbols 10, 11. Strictly speaking, these are naturally the measured values for the drive currents. For the purposes of a simple explanation, this distinction is ignored here.

In this case and preferably, the power controller 5 therefore determines the manipulated variables for the "future" drive voltages 8, 9 on the basis of the present drive currents 10, 11 and the present drive voltages 8, 9. Preferably, the power controller 5 first determines values for the two present electrical powers that are output to the drives 2, 3 and generates the manipulated variables for the two "future" drive voltages 8, 9 on the basis of the difference between these values.

Using the arrangement described to this point, it is possible to ensure that an identical electrical power consumption is always established for both drives 2, 3.

The operation of the drive arrangement according to the proposal, however, also depends on the ability to influence the level of the power that is output in total to the two drives 2, 3, for example in order to implement speed regulation. For this purpose, a manipulated variable 15, which is preferably generated by a movement controller 14, can be applied to the power controller 5.

In this case, the movement controller 14 is used for the closed-loop control of the adjustment speed of the tailgate 1. The movement controller 14 generally processes a reference variable 16 for a setpoint adjustment speed from a superordinate open-loop control system. In addition, a measured value for the present adjustment speed 17 of the tailgate 1 is applied to the movement controller 14 as feedback. Finally, the movement controller 14 generates a manipulated variable 15 from the system deviation between the reference variable 16 and the adjustment speed 17 in a manner which is likewise known per se, said manipulated variable in this case being connected to the power controller 5.

The present adjustment speed 17 is in this case and preferably derived from the drive speed of the drive 3 at the bottom in FIG. 2. In principle, it is also conceivable to derive the adjustment speed 17 from a sensor arranged directly on the tailgate 1.

Various possibilities are now conceivable in respect of the way in which the power controller 5 generates the manipulated variables 6, 7 for the two drive voltages 8, 9 on the basis of the manipulated variable 15 generated by the movement controller 14 whilst at the same time implementing the above identical power consumption.

In one variant, the power controller 5 generates the manipulated variables 6, 7 for the drive voltages 8, 9 of the two drives 2, 3 in such a way that the manipulated variable 15 generated by the movement controller 14 always corresponds to the mean value of the two manipulated variables 6, 7 for the drive voltages 8, 9 or is proportional to this mean value. In this case, it is therefore true that any change to the two manipulated variables 6, 7 for the drive voltages 8, 9 during the course of the above closed-loop power control always takes place "symmetrically" with respect to the manipulated variable 15 generated by the movement controller 14.

However, it is also conceivable for the power controller 5 to generate the manipulated variables 6, 7 for the drive voltages 8, 9 of the two drives 2, 3 in such a way that one of the manipulated variables 6, 7 for the drive voltages 8, 9 corresponds to the manipulated variable 15 generated by the movement controller 14 or is proportional to this manipulated variable 15. In this case, the manipulated variable 15 generated by the movement controller 14 is simply adopted for one of the manipulated variables 6, 7, with the result that only the respective other manipulated variable 7, 6 is adjusted such that, overall, an identical electrical power consumption is again established for the two drives 2, 3.

Mention has already been made further above of the fact that the two manipulated variables 6, 7 correspond to the drive voltages 8, 9 apart from a proportionality factor which may be present. This can be attributed to the fact that the two manipulated variables 6, 7 generated by the power controller 5 are only connected to the drives 2, 3 or to power drivers 18, 19 connected upstream of the drives 2, 3. This can be seen from the illustration in FIG. 2.

In the embodiment illustrated, the power controller 5 itself is to a certain extent part of a controlled system which is associated with the movement controller 14 and to which the manipulated variable 15 of the movement controller 14 is generally applied. However, this is not necessarily the case. For example, the power controller 5 can also be an integral part of a movement controller 14.

In addition, it is conceivable for a movement controller 14 to be dispensed with completely, for example if simply open-loop control of the drives 2, 3 is provided. In this case, the "manipulated variable" which is connected to the power controller 5 is predetermined by a user input, for example.

For reasons of completeness, reference can also be made to the fact that the current measurement devices 12, 13 are connected not only to the power controller 5 but also to an overcurrent monitoring unit 20. If one of the measured drive currents 10, 11 should exceed a predetermined threshold, the overcurrent monitoring unit 20 emits a corresponding overcurrent signal 21 to the movement controller 14. There, stopping and/or braking of the tailgate 1 is triggered by a corresponding manipulated variable 15 being prescribed.

Figure 3:
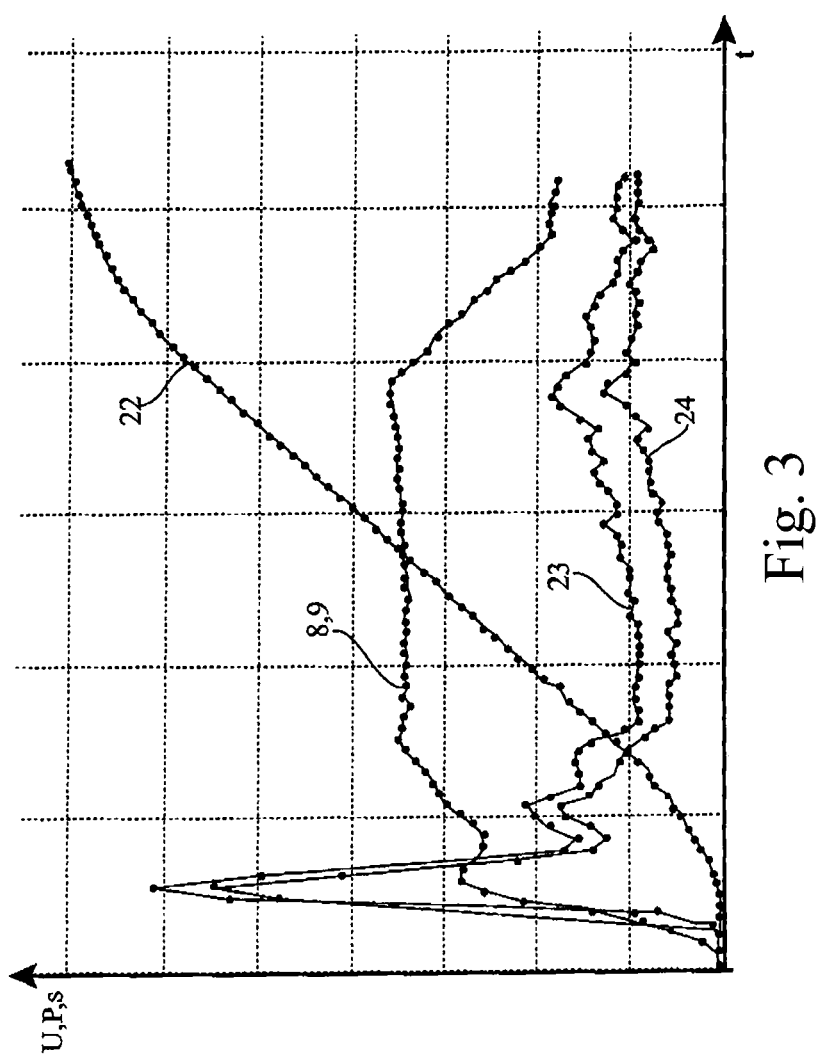
FIG. 3 shows a timing diagram of the profile of the drive voltages, of the electrical powers consumed by the two drives and of the adjustment path during the opening of the tailgate shown in FIG. 1.
Figure 4:
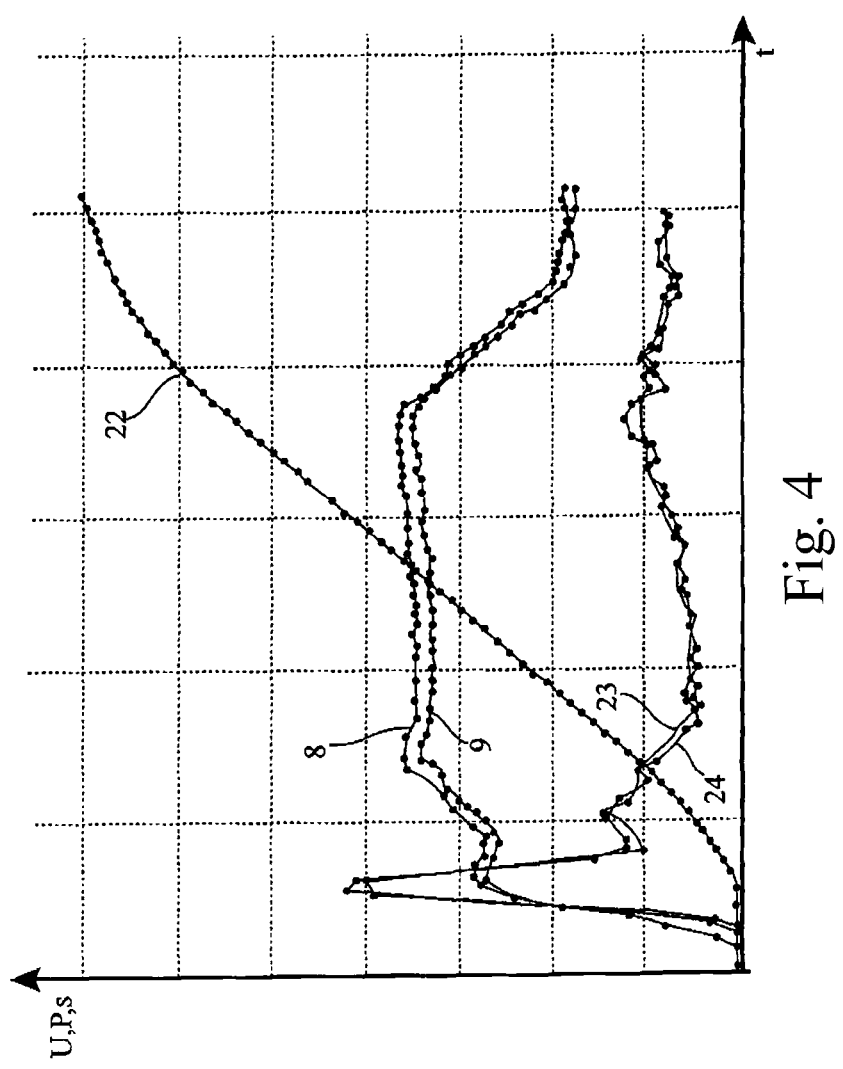
FIG. 4 shows a timing diagram, as shown in FIG. 3, of the profile of the drive voltages, of the electrical powers consumed by the two drives and of the adjustment path.

In order to explain the way in which the power controller 5 operates, reference can be made to FIGS. 3 and 4.

FIG. 3 shows a timing diagram during opening of the tailgate 1 for an arrangement as shown in FIG. 2, in which a power controller 5 according to the proposal has not been provided or has been disconnected, however. The manipulated variable 15 generated by the movement controller 14 is therefore connected directly to the two power drivers 18, 19.

FIG. 3 shows first the profile of the drive voltages 8, 9, which correspond to the manipulated variable 15 generated by the movement controller 14. The illustration shows that the drive voltages 8, 9 are in this case ultimately one and the same drive voltage. This drive voltage results in the adjustment path 22.

An interesting feature from the timing diagram illustrated in FIG. 3 is the fact that the electrical powers consumed by the two drives 2, 3 have marked differences. These powers have in this case been provided with the reference symbols 23, 24.

FIG. 4 shows a timing diagram during opening of the tailgate 1 for an arrangement as shown in FIG. 2 with the power controller 5 connected. The illustration in FIG. 4 corresponds to the illustration in FIG. 3, wherein, owing to the different scales, no possibility of comparison of the respective absolute values between the two illustrations has been provided, but this is not necessary for understanding the teaching. The powers have been provided with the reference symbols 23, 24 in this case too. It is clear from this illustration that the powers 23, 24 consumed by the drives 2, 3 are largely identical during the adjustment of the tailgate 1. Now, therefore, both the drive voltages 8, 9 and the drive currents 10, 11 are different within wide ranges, but the powers 23, 24 consumed by the two drives 2, 3 are largely identical, as explained above. The abovementioned, nonuniform wear no longer takes place as a result of the functionality of the power controller 5.

The power controller 5 can also be useful in quite a different respect. The reason is that, in the case of a drive arrangement with two drives 2, 3, in principle there is the risk of faults occurring in the drivetrain of one of the two drives 2, 3. For example, the drive-coupling of one of the two drives 2, 3 to the tailgate 1 or to the motor vehicle chassis can open. This would temporarily result in an extreme imbalance in the electrical powers consumed by the drives 2, 3, which can be detected easily in the power controller 5. In this case and preferably, therefore, provision is made for the power controller 5 to output a corresponding signal and/or to switch over to an emergency and/or holding mode in the event of a predetermined limit difference between the two present powers being exceeded.

It has already been mentioned that the drives 2, 3 are preferably configured in the form of spindle drives. In this case, the drives 2, 3 have a drive motor 2a, 3a and a downstream spindle/spindle nut transmission 2b, 3b. The two spindle drives 2, 3 are then arranged on two opposite peripheral sides of the tailgate 1, as can be seen to some extent from FIG. 1. Reference can once again be made to DE 20 2007 005 749 U1, mentioned above in this context.

Reference has likewise already been made to the fact that the solution according to the proposal can be applied to all possible types of adjustable elements in a motor vehicle. Particularly preferred here is the configuration of the adjustable element 1 in the form of a gate or cover, in particular in the form of a tailgate, or in the form of a door, in particular in the form of a hinged or sliding door, or in the form of a cargo floor. All other configurations of an adjustable element which are mentioned in the introduction to the description are likewise preferably provided.

In accordance with a further teaching with its own significance, an adjustable element arrangement in a motor vehicle with an adjustable element 1 and with a drive arrangement according to the proposal for the motor-driven adjustment of the adjustable element 1 are claimed. Full reference can be made to the above statements regarding the drive arrangement according to the proposal.

In accordance with a further teaching, likewise with its own significance, a method for driving a drive arrangement according to the proposal is claimed. It is essential here that, during the motor-driven adjustment of the adjustable element 1, the electrical power that is output respectively to the two drives 2, 3 is subjected to closed-loop control, for the purpose of compensating for the tolerance-related discrepancies, in such a way that an identical power consumption is established for both drives 2, 3. In the context of this further teaching too, reference can be made to the statements relating to the drive arrangement according to the proposal insofar as these statements are suitable for explaining the claimed method.

The invention claimed is:

1. A drive arrangement for the motor-driven adjustment of an adjustable element in a motor vehicle, the drive arrangement having two electrical drives and a control device, the drives, in the fitted state, acting in the same way on the adjustable element and having a substantially identical configuration, apart from tolerance-related discrepancies, wherein the control device has a power controller which, in the fitted state, subjects the electrical power that is output respectively to the two drives to closed-loop control, for the purpose of compensating for the tolerance-related discrepancies, in such a way that an identical electrical power consumption is established for both drives, wherein the power controller generates a respective manipulated variable for the drive voltages of the two drives such that an identical electrical power consumption is established for both drives, and wherein the power controller generates the manipulated variables for the two drive voltages on the basis of the drive currents and the drive voltages.

2. The drive arrangement as claimed in claim 1, wherein the drives each have an electrical drive motor, and the discrepancies to be compensated for between the two drives can be attributed to tolerance-related differences in the motor characteristics of the drive motors.

3. The drive arrangement of claim 2, wherein the motor is a DC motor.

4. The drive arrangement as claimed in claim 1, wherein the drives, in the fitted state, are coupled to the adjustable element in such a way that the drive speeds of the two drives are always identical to one another during a motor-driven adjustment.

5. The drive arrangement as claimed in claim 1, wherein the power controller generates a respective manipulated variable for the drive voltages of the two drives such that an identical electrical power consumption is established for both drives.

6. The drive arrangement as claimed in claim 5, wherein the power controller generates the manipulated variables for the two drive voltages on the basis of the present drive currents and the present drive voltages.

7. The drive arrangement of claim 6, wherein the power controller determines values for the two powers presently being output to the drives and generates the manipulated variables for the two drive voltages on the basis of the difference between these values.

8. The drive arrangement as claimed in claim 5, wherein the power controller generates the manipulated variables for the two drive voltages in such a way that the manipulated variable generated by the movement controller always corresponds to the mean value of the two manipulated variables for the drive voltages or is proportional to this mean value.

9. The drive arrangement as claimed in claim 5, wherein the two manipulated variables generated by the power controller are connected to the drives or to power drivers connected upstream of the drives.

10. The drive arrangement as claimed in claim 1, wherein appropriate current measurement devices are associated with the power controller for determining the drive currents presently being output to the two drives.

11. The drive arrangement as claimed in claim 1, wherein the control device comprises a movement controller for the closed-loop control in particular of the adjustment speed of the adjustable element, with the power controller connected downstream of said movement controller.

12. The drive arrangement as claimed in claim 11, wherein the power controller generates the manipulated variables for the drive voltages of the two drives in such a way that one of the manipulated variables for the drive voltages corresponds to the manipulated variable generated by the movement controller or is proportional to this manipulated variable.

13. The drive arrangement of claim 11, wherein the power controller generates the manipulated variables for the two drive voltages on the basis of the manipulated variable generated by the movement controller.

14. The drive arrangement as claimed in claim 1, wherein the power controller outputs a corresponding signal and switches over to a mode selected from an emergency mode, a holding mode, and a combination thereof in the event of a predetermined limit difference between the two present powers being exceeded.

15. The drive arrangement as claimed in claim 1, wherein the drives are each configured in the form of spindle drives.

16. The drive arrangement of claim 15, wherein the two spindle drives are arranged on two opposite peripheral sides of the adjustable element.

17. The drive arrangement as claimed in claim 1, wherein the adjustable element is configured in a form selected from a gate a door and a cargo floor.

18. The drive arrangement of claim 17, wherein the gate comprises a tailgate, and the door comprises a hinged or sliding door.

19. An adjustable element arrangement in a motor vehicle with an adjustable element and a drive arrangement for the motor-driven adjustment of the adjustable element, the drive arrangement having two electrical drives and a control device, the drives acting in the same way on the adjustable element and having a substantially identical configuration, apart from tolerance-related discrepancies, wherein the control device has a power controller which, subjects the electrical power that is output respectively to the two drives-to closed-loop control, for the purpose of compensating for the tolerance-related discrepancies, in such a way that an identical electrical power consumption is established for both drives, wherein the power controller generates a respective manipulated variable for the drive voltages of the two drives such that an identical electrical power consumption is established for both drives, and wherein the power controller generates the manipulated variables for the two drive voltages on the basis of the drive currents and the drive voltages.

20. The adjustable element arrangement of claim 19, wherein the control device subjects the electrical power outlet to a closed loop control during the motor-driven adjustment of the adjustable element.

21. A method for driving a drive arrangement, which is used for the motor-driven adjustment of an adjustable element in a motor vehicle, the drive arrangement having two electrical drives and a control device, the drives, in the fitted state, acting in the same way on the adjustable element and having a substantially identical configuration, apart from tolerance-related discrepancies, wherein, during the motor-driven adjustment of the adjustable element, the electrical power that is output respectively to the two drives is subjected to closed-loop control, for the purpose of compensating for the tolerance-related discrepancies, in such a way that an identical electrical power consumption is established for both drives, wherein the power controller generates a respective manipulated variable for the drive voltages of the two drives such that an identical electrical power consumption is established for both drives, and wherein the power controller generates the manipulated variables for the two drive voltages on the basis of the drive currents and the drive voltages.

22. The drive arrangement of claim 1, wherein the fitted state is during the motor-driven adjustment of the adjustable element.

* * * * *